United States Patent
Blanchet et al.

(10) Patent No.: US 10,688,562 B2
(45) Date of Patent: Jun. 23, 2020

(54) LASER SINTERING METHOD FOR MANUFACTURING A TREAD MOLDING ELEMENT

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (FR)

(72) Inventors: Etienne Blanchet, Clermont-Ferrand (FR); Supradit Khaoyabut, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 350 days.

(21) Appl. No.: 15/537,235

(22) PCT Filed: Dec. 16, 2015

(86) PCT No.: PCT/EP2015/080043
§ 371 (c)(1),
(2) Date: Jun. 16, 2017

(87) PCT Pub. No.: WO2016/097015
PCT Pub. Date: Jun. 23, 2016

(65) Prior Publication Data
US 2017/0368606 A1    Dec. 28, 2017

(30) Foreign Application Priority Data
Dec. 18, 2014  (FR) ...................................... 14 62681

(51) Int. Cl.
*B29C 64/153*    (2017.01)
*B22F 5/00*    (2006.01)
(Continued)

(52) U.S. Cl.
CPC ............ *B22F 5/007* (2013.01); *B22F 3/1055* (2013.01); *B29C 64/153* (2017.08);
(Continued)

(58) Field of Classification Search
CPC ........... B22F 3/1055; B22F 2003/1057; B29C 64/153; B33Y 10/00; B33Y 40/00
See application file for complete search history.

(56) References Cited

U.S. PATENT DOCUMENTS 5,155,324 A * 10/1992 Deckard ................. B22F 3/004
264/497
5,660,651 A * 8/1997 Diensthuber ....... B60C 11/0304
152/209.18

(Continued)

FOREIGN PATENT DOCUMENTS

FR    2975319 A1 * 11/2012 ............. B23K 26/34
JP    60056605 A * 4/1985 ............. B60C 11/12

*Primary Examiner* — Jacob T Minskey
*Assistant Examiner* — Cedrick S Williams
(74) *Attorney, Agent, or Firm* — Dickinson Wright PLLC; Steven Hurles

(57) ABSTRACT

The disclosure relates to a selective laser sintering method of manufacturing a tread molding element, said tread molding element including at least a fine lamella adapted to mold a shallow sipe in a tire tread, the fine lamella having a length (L2). The fine lamella is sintered in a plurality of portions (p2) at different layers (N), in each layer (N) the laser beam sinters the portion (p2) of the fine lamella in only one passage in the length (L2) of the fine lamella without round-trip passage of the laser beam, the direction (D1) of this passage being the same at the different layers (N) for building the different portions (p2) of the fine lamella. The (Continued)

thickness (w) of the fine lamella is smaller than 0.2 mm, and the height (h) of the fine lamella is smaller than or equal to 2 mm.

12 Claims, 4 Drawing Sheets

(51) Int. Cl.
- *B22F 3/105* (2006.01)
- *B29D 30/06* (2006.01)
- *B33Y 80/00* (2015.01)
- *B33Y 10/00* (2015.01)
- *B29D 30/66* (2006.01)

(52) U.S. Cl.
CPC ......... *B29D 30/0606* (2013.01); *B29D 30/66* (2013.01); *B33Y 10/00* (2014.12); *B33Y 80/00* (2014.12); *B22F 2003/1057* (2013.01); *B29D 2030/0613* (2013.01); *B29D 2030/0616* (2013.01); *Y02P 10/292* (2015.11); *Y02P 10/295* (2015.11)

(56) References Cited

U.S. PATENT DOCUMENTS

| | | | |
|---|---|---|---|
| 6,896,503 B1* | 5/2005 | Pinkawa | B29D 30/0606 |
| | | | 425/28.1 |
| 2001/0048182 A1 | 12/2001 | Caretta et al. | |
| 2006/0257511 A1 | 11/2006 | Iwamoto et al. | |
| 2007/0245950 A1 | 10/2007 | Teulet | |
| 2008/0241392 A1 | 10/2008 | Dimter et al. | |
| 2013/0118660 A1 | 5/2013 | Gay et al. | |
| 2014/0147538 A1 | 5/2014 | Bonnet | |
| 2014/0242400 A1 | 8/2014 | Hoebel et al. | |
| 2015/0086409 A1* | 3/2015 | Hellestam | B22F 3/1055 |
| | | | 419/55 |
| 2015/0198052 A1 | 7/2015 | Pavlov et al. | |
| 2015/0251499 A1* | 9/2015 | Jin | B60C 11/1218 |
| | | | 152/209.21 |
| 2015/0375456 A1* | 12/2015 | Cheverton | B29C 64/153 |
| | | | 264/406 |
| 2016/0136730 A1* | 5/2016 | McMurtry | G02B 26/02 |
| | | | 425/162 |

* cited by examiner

LASER SINTERING METHOD FOR MANUFACTURING A TREAD MOLDING ELEMENT

CROSS-REFERENCE TO RELATED APPLICATIONS

This application is a 371 national phase entry of PCT/EP2015/080043, filed 16 Dec. 2015, which claims the benefit of French Patent Application No, 1462681, filed 18 Dec. 2014, the contents of which are incorporated herein by reference for all purposes.

BACKGROUND

Document WO2011151311 discloses a molding element for a mold for a tire comprising a tread provided with a plurality of blocks. Each block comprises a contact surface intended to come into contact with a road surface during running. The molding element also comprises a molding surface for molding the contact surfaces of the blocks. The molding surface comprises a plurality of fine lamellas intended to mold shallow sipes in the blocks. The shallow sipes improve the grip of the tire during rolling on icy roads. The fine lamellas are here made of aluminum obtained by molding from a plaster mold form. However, due to the weak dimension of the fine lamellas, obtaining molding elements with such fine lamellas using standard processes like milling, is difficult and expensive.

Document EP1641580 refers to a selective laser sintering method (SLS), in that document, a first layer of metallic powder is spread on a plate. All or some of the particles of this first layer of powder are then agglomerated by the beam of a laser according to the shape of the object that is to be obtained. The beam of the laser makes a plurality of round-trip passages to sinter the powder. Once this step has been carried out, a second layer of powder is spread over the first layer of powder and is, in turn, selectively fused by the laser. By repeating these operations of spreading a layer and fusing it using a laser, a sintered object is built up layer by layer.

A "tire" means all types of elastic tire whether or not subjected to an internal pressure.

A "tread" of a tire means a quantity of rubber material hounded by lateral surfaces and by two main surfaces one of which is intended to come into contact with a road surface when the tire is running.

A "tread surface" means the surface formed by those points on the tire tread that come into contact with the road surface when the tire is running.

A "mold" means a collection of separate molding elements which, when brought closer towards one another, delimit a toroidal molding space.

A "molding element" of a mold means part of a mold. A molding element is, for example, a mold segment.

A "fine lamella" of a molding element means a protrusion projecting from the molding surface, intended to mold a shallow sipe in the tire tread;

A "rib" of a molding element means a protrusion projecting from the molding surface, intended to mold a sipe or a groove in the tire tread. By "groove" or "sipe", it is intended a cut with a width larger than or equal to 0.2 mm.

SUMMARY

The present disclosure relates to a selective laser sintering method of manufacturing a tread molding element, said tread molding element comprising at least a fine lamella adapted to mold a shallow sipe in a tire tread.

It is an object of the present disclosure to adapt the characteristics of the selective laser sintering method for providing molding elements with fine lamellas, which are simple and economical to produce.

To this end, there is provided a selective laser sintering method of manufacturing a tread molding element, said tread molding element comprising at least a fine lamella adapted to mold a shallow sips in a tire tread, the fine lamella having a length. The fine lamella is sintered in a plurality of portions at different layers. In each layer, the laser beam sinters the portion of the fine lamella in only one passage in the length of the fine lamella without round-trip passage of the laser beam. The direction of this passage is the same at the different layers for building the different portions of the fine lamella. The thickness of the fine lamella is smaller than 0.2 mm, and the height of the fine lamella 20 is smaller than or equal to 2 mm.

By sintering the fine lamella in one passage in each layer and always in the same direction at each layer, it is possible to obtain a fine lamella with a very small thickness (inferior to 0.2 mm). Indeed, since the height of the fine lamella is quite low, the rigidity of this lamella is maintained in the tread molding element.

According to non-limiting embodiments of the disclosure, the selective laser sintering methods in accordance with the disclosure further comprise the following characteristics.

In a non-limiting embodiment, the fine lamella has a complex shape in its length, like a wavy, sinusoidal or zigzag shape or a combination thereof.

Selective laser sintering methods according to the disclosure obtain complex fine lamella without round-trip passage of the laser. In this way, the fine lamella is produced in only one passage, the direction of this passage being the same at the different layers.

In a non-limiting embodiment, the characteristics of the laser beam are the same at the different layers for building the different portions of the fine lamella.

Such characteristics include, but are not limited to, the laser beam diameter, the laser velocity, the laser power, the laser path vectors, etc.

In a non-limiting embodiment, the fine lamella has a height that exhibits a complex shape, such as a wavy, sinusoidal or zigzag shape or a combination thereof.

Selective laser sintering methods according to the disclosure enable production of a 3D complex fine lamella. In this way, the fine lamella is produced in only one passage without round-trip passage of the laser beam. The direction of this passage is the same at the different layers but the path of the laser beam is different between at least two layers.

In a non-limiting embodiment, the tread molding element comprises at least two adjacent fine lamellas, in each layer the laser sinters the portions of the two fine lamellas in one round-trip passage of the laser beam.

By sintering a portion of two different fine lamellas in one round-trip passage of a laser beam, it is possible to optimize the production time of the whole tread molding element.

In a non-limiting embodiment, a tread molding element comprises a plurality of fine lamellas and at least one rib.

Selective laser sintering methods enable production of a tread mold element comprising a complex assembly of fine lamellas and a rib.

In a non-limiting embodiment, the rib is sintered in a plurality of portions at the different layers. In each layer the laser sinters the portion of the rib in a plurality of round-trip passages of the laser beam.

In a non-limiting embodiment, for a same layer, the sintering of the fine lamella is along a first path and the sintering of the rib is along a plurality of parallel second paths different from the first path.

Thus, it is possible to adapt the laser beam path to the dimension of the protrusion (fine lamella, rib) to sinter. The cost-production of the tread molding element is also improved.

In a non-limiting embodiment, for two consecutive layers, the characteristics of the second path, like the vector path, for sintering two portions of the rib are different.

By sintering the different portions of the rib with different second paths at different layers, we limit the presence of weakness zones in the rib and we improve consequently the density of this rib. Roughness of the rib walls is also improved.

In a non-limiting embodiment, said selective laser sintering method uses a laser and further comprises the modification of the characteristics of the laser beam according to the ribs or to the fine lamellas to be sintered.

Such characteristics include, but are not limited to, the laser beam diameter, the laser velocity, the laser path vectors, etc.

This permits to adapt the laser beam according to the type of part of the tread molding element to be molded.

In addition, there is provided a tread molding element comprising a plurality of ribs and a plurality of fine lamellas, said tread molding element being manufactured by the selective laser sintering method according to any one of the previous characteristics.

In addition, there is provided a computer program product comprising a set of instructions, which when loaded into a computer, causes the computer to carry out the selective laser sintering method according to any one of the previous characteristics.

BRIEF DESCRIPTION OF THE DRAWINGS

Some embodiments of methods and/or apparatus in accordance with embodiments of the present disclosure are now described, by way of example only, and with reference to the accompanying drawings, in which.

DETAILED DESCRIPTION

In the following description, well-known functions or constructions by the man skilled in the art are not described in detail since they would obscure the disclosure in unnecessary detail.

In the following description, elements that are substantially identical or similar will be denoted by identical references.

Figure 1:
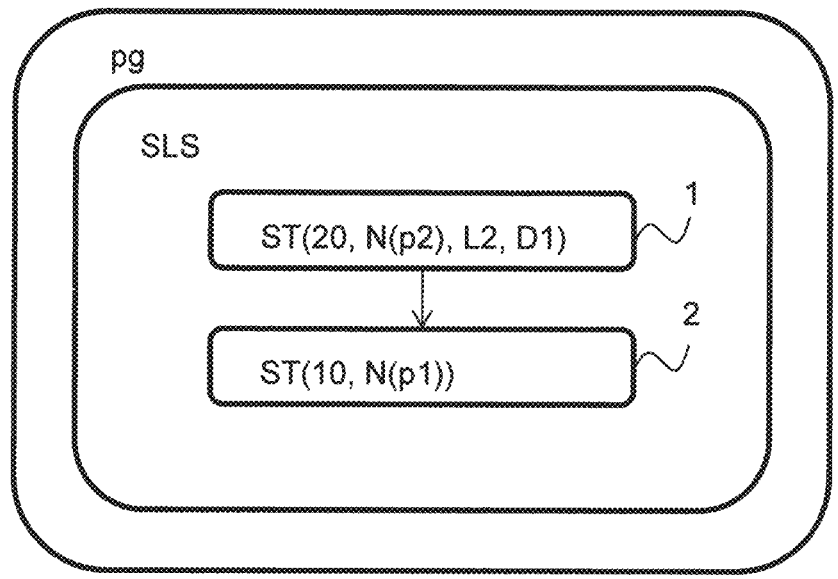
FIG. 1 schematically depicts a first diagram of an exemplary selective laser sintering method.

The selective laser sintering method of manufacturing a tread molding element 1, said tread molding element 1 comprising at least a fine lamella 20 adapted to mold a shallow sipe in a tire tread, the fine lamella having a length L2, is described in FIG. 1.

The selective laser sintering method comprises the sintering of the fine lamella 20 in a plurality of portions p2 at different layers N by a laser beam B, the portion p2 of the fine lamella 20 in each layer being sintered in only one passage in the length L2 of the fine lamella without round-trip passage of the laser beam B, the direction D1 of this passage being the same at the different layers N for building the different portions p2 of the fine lamella 20 (step 1) illustrated in FIG. 1 ST(20, N(p2), L2, D1), where, as described above, 20 is the object to build, N(P2) the portion of the object to build in the layer N, L2 the path of the laser beam used to build the portion of the object in the layer N, D1 a sintering parameter used in the layer N.

This avoids increasing the thickness of the shallow sipe to sinter.

The selective laser sintering method is explained in more detail hereinafter with reference to the figures of a tread molding element 1.

For the following, a layer N is a layer of composite powder which is used by a laser beam B for the sintering of a portion of fine lamella 20 and/or a portion of a rib 10.

Figure 2:
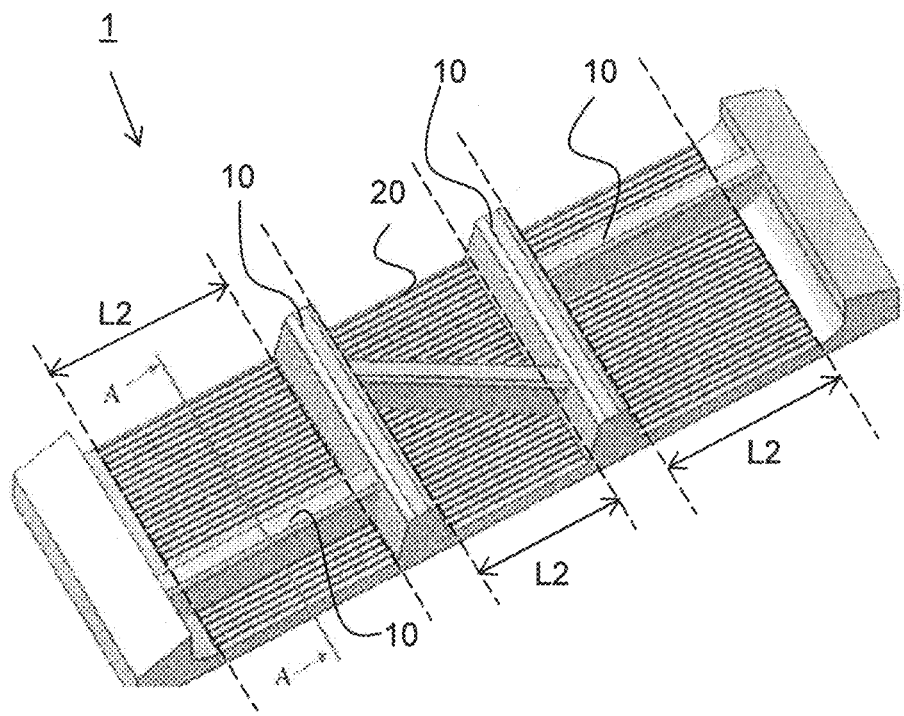
FIG. 2 depicts a tread molding element according to a non-limiting embodiment obtained by the selective laser sintering method of FIG. 1, said tread molding element comprising a plurality of ribs and fine lamellas.

The tread molding element 1 is illustrated in FIG. 2. As illustrated in the non-limiting example, it comprises a plurality of fine lamellas 20 with different length L2. The tread molding element 1 also comprises at least one rib 10. In the non-limiting illustrated example, it comprises a plurality of ribs 10, here five ribs 10.

Figure 3:
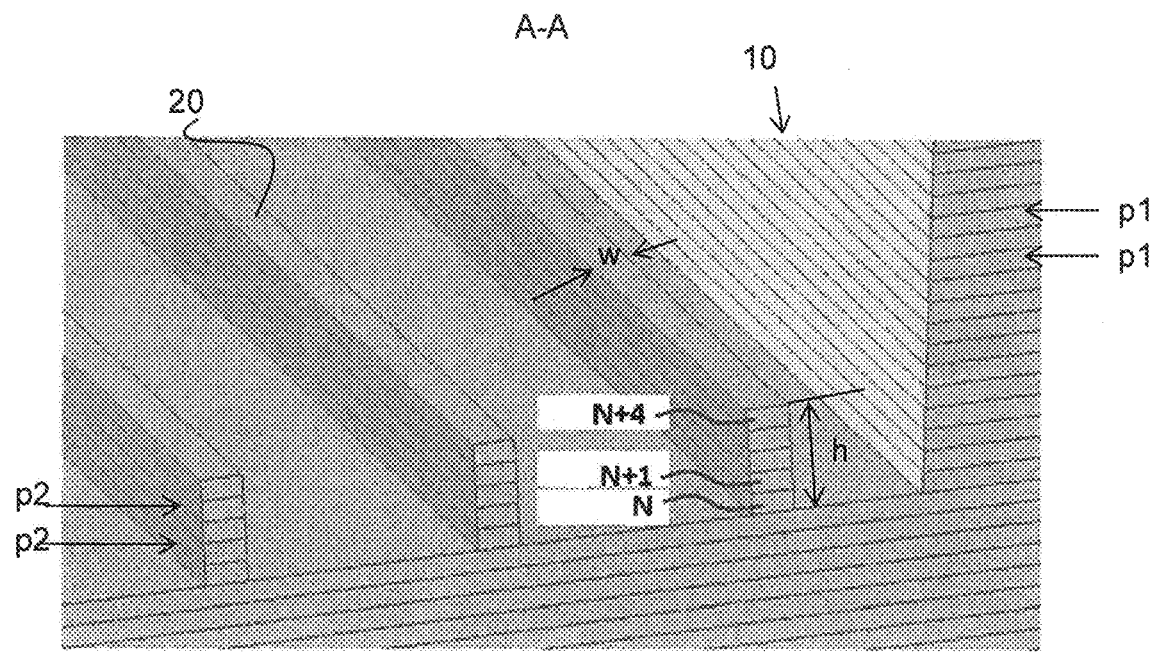
FIG. 3 is a zoom on a part of the tread molding element of the FIG. 2, which shows different layers of sintering.

FIG. 3 illustrates a zooming part of the tread molding element 1 of FIG. 2 along the axis A-A. Three fine lamellas 20 may be seen. A fine lamella 20 comprises a plurality of portions p2, one portion p2 being sintered at a layer N. In the non-limiting illustrated example, the fine lamellas 20 comprise five portions p2, each being sintered respectively at layer N, N+1, N+2, N+3 and N+4.

Figure 4:
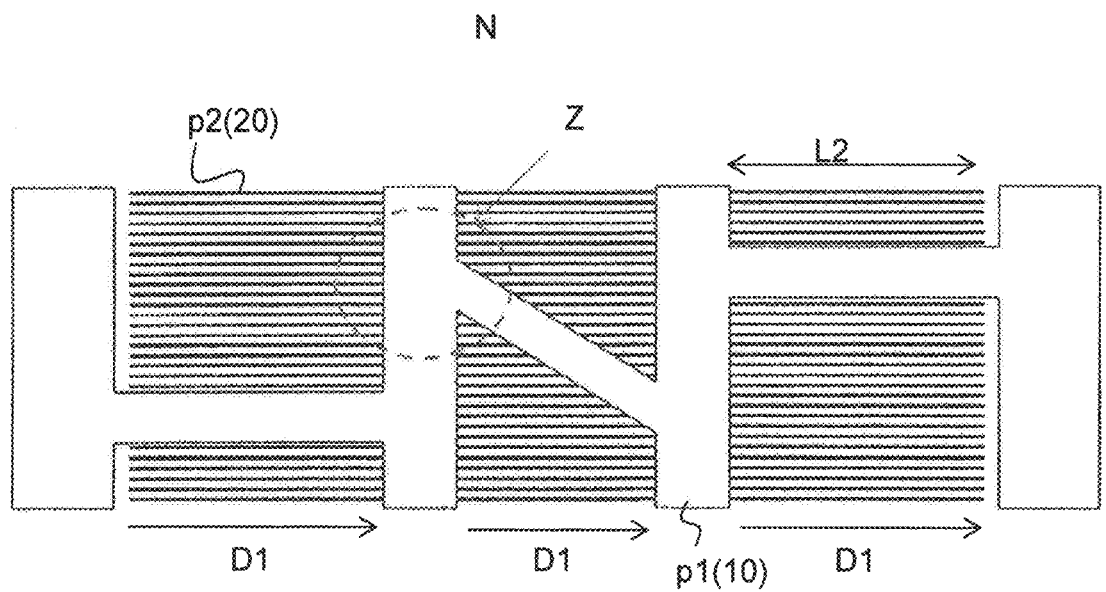
FIG. 4 illustrates a cross section of a layer of the tread molding element of FIG. 2.

FIG. 4 illustrates a cross section of a layer N of the tread molding element 1 of FIG. 2. In this layer N, the laser beam B sinters the portion p2 of a fine lamella 20 in only one passage along the length L2 of the fine lamella 20 without round-trip passage. The direction D1 of the passage is the same at the different layers N to N+4 (in the non-limitative example illustrated) for building the different portions p2 of the fine lamella 20. For example, for the first lamella 20 at the bottom of the figure, the direction D1 is going from the left to the right for this layer N. It will be the same for the other layers N+1 to N+4.

The size of the fine lamella 20 obtained with this sintering (step 1) permits to mold a shallow ripe adapted to evacuate film water on an icy road when rolling, thus improving braking performance of a tire.

In a non-limitative embodiment, the thickness w of the fine lamella 20 is smaller than 0.2 mm, and the height h of the fine lamella 20 is smaller than or equal to 2 mm.

As illustrated, the tread molding element 1 comprises at least two adjacent fine lamellas 20, In a non-limitative embodiment, in each layer N the laser beam B sinters the portions p2 of these two fine lamellas 20 in one round-trip passage.

Figure 5:
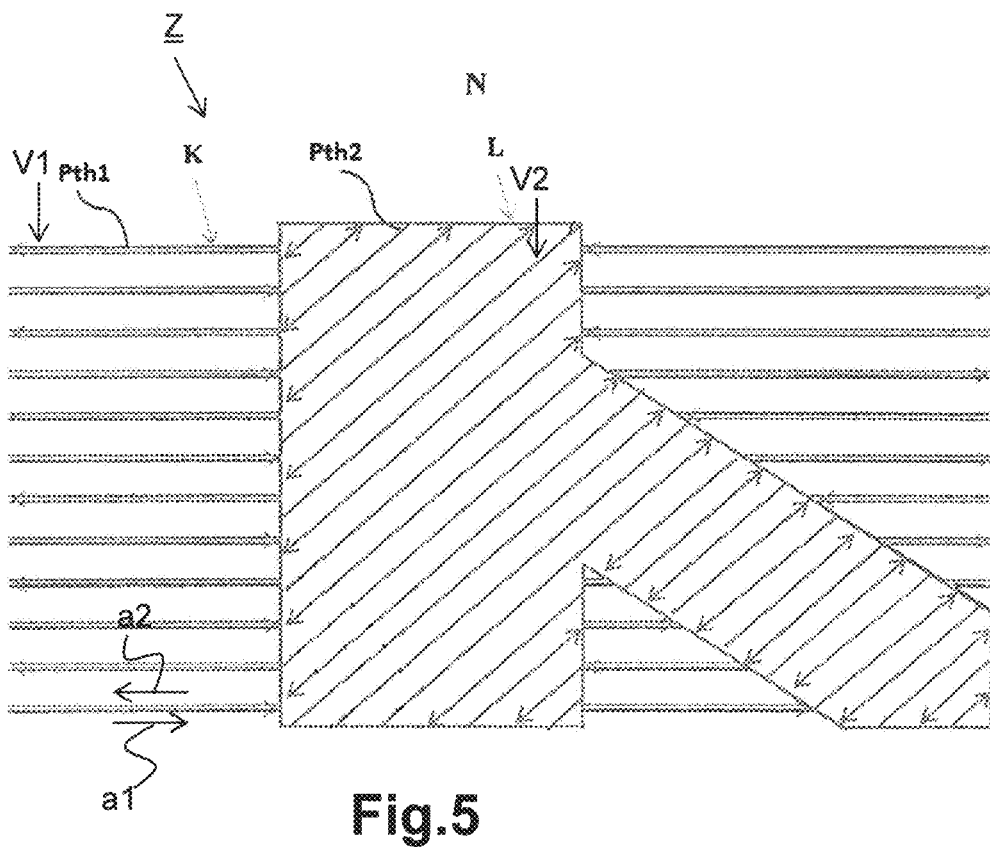
FIG. 5 depicts different paths of a laser beam used for the selective laser sintering method of FIG. 1 for sintering the ribs and lamellas of the tread molding element of FIG. 2 on a layer N.

FIG. 5 illustrates the passages of the laser beam B to sinter the fine lamella 20 of a part Z of the tread molding element 1 illustrated in FIG. 4, at layer N. It also illustrates the passages of the laser beam B to sinter the ribs 10 of said part Z at layer N.

Figure 6:
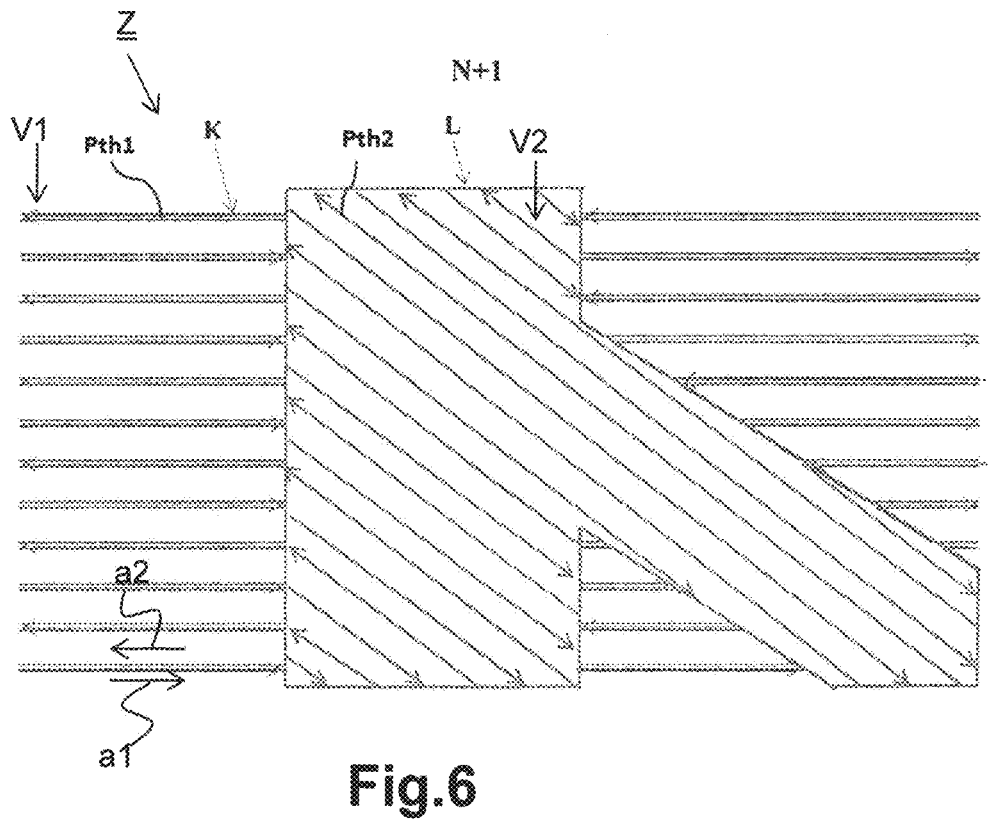
FIG. 6 depicts different paths of a laser beam used for the selective laser sintering method of FIG. 1 for sintering the ribs and lamellas of the tread molding element of FIG. 2 on a next layer N+1.

FIG. 6 illustrates the passages of the laser beam B to sinter the fine lamella 20 of said part Z of the tread molding element 1 illustrated in FIG. 4, at layer N+1, It also illustrates the passages of the laser beam B to sinter the ribs 10 of said part Z at layer N+1.

As illustrated in FIG. 5, in layer N, the laser beam B sinters the portions p2 of two adjacent fine lamellas 20 in one round-trip passage (illustrated by the opposite horizontal arrows referenced a1 and a2). The direction D1 of the passage for the fine lamella 20 at the bottom of the figure is going from the left to the right, whereas the direction D1 of the passage for the adjacent lamella is going from the right to the left. The same applied for layer N+1 illustrated in FIG. 6.

In a non-limiting embodiment, the characteristics of the laser beam B are the same at the different layers N for building the different portions p2 of the fine lamella 20. In non-limitative examples, the characteristics are the laser beam diameter, laser velocity, laser path vectors, laser power, etc. Furthermore, the fine lamellas 20 will be built in the same manner by the laser beam B.

In FIG. 5 and FIG. 6, one can see that the direction D1 of the passage for sintering the fine lamella 20 at the bottom of the figures is the same for layer N and for layer N+1 as explained above. The direction D1 goes from the left to the right in the non-limitative example illustrated.

In the same manner as for the fine lamellas 20, the ribs 10 of the tread molding element 1 are sintered in a plurality of portions p1 at different layers N, as illustrated in FIG. 3.

But, contrary to the sintering of the fine lamellas 20, in a non-limitative embodiment, in each layer N the laser beam B sinters the portion p1 of the rib 10 in a plurality of round-trip passages of the laser beam B as illustrated by the different arrows in opposite directions in FIG. 5 for a layer N, and in FIG. 6 for a next layer N+1.

Hence, in a non-limitative embodiment, the selective laser sintering method further comprises sintering of a rib 10 in a plurality of portions p2 at the different layers N, in each layer N the portion p1 of the rib 10 being sintered in a plurality round-trip passages of the laser beam B ((step 2) illustrated in FIG. 1 ST(10, N(p1)).

As illustrated in FIG. 5 and in FIG. 6, in a non-limiting embodiment, for a same layer N, the sintering of the fine lamella 20 is along a first path Pth1 and the sintering of the rib 10 is along a plurality of parallel second paths Pth2 different from the first path Pth1.

In the non-limiting example illustrated in FIG. 5, the first path Pth1 of a fine lamella 20 is a horizontal line. In layer N, the laser beam B moves in a contour K of a fine lamella 20 according to first path vector V1 which follows the first path Pth1. The laser beam follows the same first path vector V1 in the other fine lamellas lines until it finishes all the sintering of the fine lamellas 20 in this layer N.

In the non-limiting example illustrated in FIG. 5, the second path Pth2 of a rib 10 is a line which is inclined from the line of the first path Pth1 from 45°. In layer N, the laser beam B moves in a contour L of a rib 10 according to a second path vector V2 which follows the second path Pth2. The laser beam follows the same second path vector V2 in the other rib lines until it finishes all the sintering of the ribs 10 in this layer N.

In the next layer N+1 illustrated in FIG. 6, the laser beam B moves in a contour K of a fine lamella 20 according to the same first path vector V1 of the previous layer N which follows the first path Pth1. The laser beam B follows the same first path vector V1 in the other fine lamellas lines until it finishes all the sintering of the fine lamellas 20 in this layer N+1.

In a non-limiting embodiment, for two consecutive layers N and N+1, the angle of the second paths Pth2 for sintering two portions of the rib 10 are different. It improves the internal density of the ribs 10 and consequently the stiffness of these ribs.

Hence, as illustrated in FIG. 6, in the next layer N±1, the new second path Pth2 of a rib 10 is a line which is inclined from the line of the first path Pth1 (of a fine lamella 20) from 135°, that is to say which is inclined from the line of the second path Pth2 (of a rib 10) of the previous layer N from 90°. In said layer N+1, the laser beam B moves in a contour L of a rib 10 according to a new second path vector V2 which follows the new second path Pth2, The laser beam follows the same new second path vector V2 in the other rib lines until it finishes all the sintering of the ribs 10 in this layer N+1.

The steps for sintering the fine lamellas 20 and the ribs 10 are repeated in the layer N+2, N+3 until the whole in layer N+4 is finished.

Hence, a laser beam B path vector is adapted according to the object to be sintered, either the fine lamellas 20, pr either the ribs 10.

In a non-limiting embodiment, said selective laser sintering method uses a laser and further comprises the modification of the characteristics of the laser beam B according to the ribs 10 or to the fine lamellas 20 to be sintered.

This permits to adapt the laser beam according to the type of part of the tread molding element to be molded. Hence, in a non-limiting example, for building a fine lamella 20 which needs only one passage in each layer, the velocity of the laser beam will be less than the velocity for building a rib 10 which needs plurality of round-trip passages in each layer.

Figure 7:
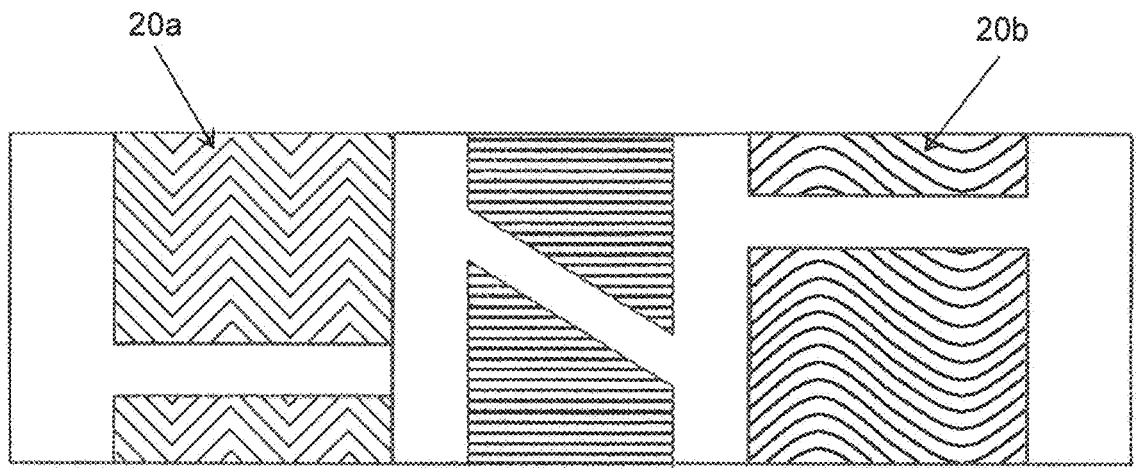
FIG. 7 depicts a plurality of fine lamellas having a complex shape in their length.

FIG. 7 depicts a plurality of fine lamellas 20a, 20b having a complex shape in their length. The fine lamellas 20a shows a zigzag shape and the fine lamellas 20b have a wavy shape.

Figure 8:
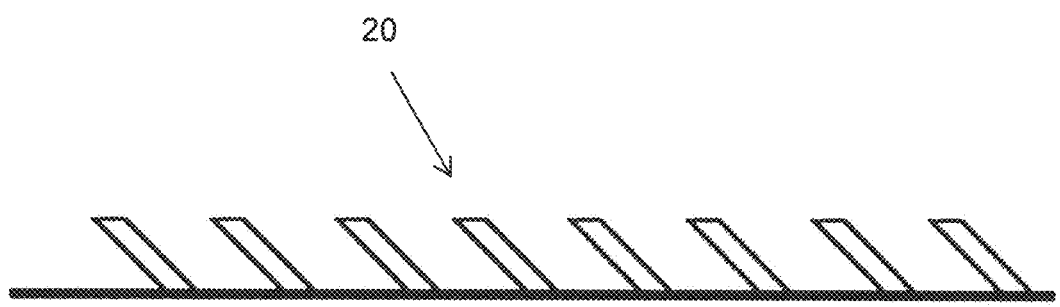
FIG. 8 depicts a plurality of fine lamellas having a complex shape in their height.

FIG. 8 depicts a plurality of fine lamellas having a complex shape in their height. In this figure, the fine lamellas are inclined in their height.

It is to be understood that the present disclosure is not limited to the aforementioned embodiments and variations and modifications may be made without departing from the scope of the disclosure. In the respect, the following remarks are made.

The embodiments are also intended to cover computers programmed to perform said steps of the above-described selective laser sintering method.

Hence, in a non-limiting embodiment, one or a plurality of computer program products pg (also called computer programs pg) as illustrated in FIG. 1 can be contained in a computer. A computer program product pg comprises a set of instructions. Thus, said set of instructions contained, for example, in a computer, may cause the computer to carry out the different steps of the selective laser sintering method. In some embodiments, at least one programmable controller executes the selective laser sintering method.

The invention claimed is:

1. A selective laser sintering method of manufacturing a tread molding element, said tread molding element comprising:
   at least a fine lamella to mold a shallow sipe in a tire tread, the fine lamella having a length (L2), wherein
   the fine lamella is sintered in a plurality of portions at different layers (N), in each layer a laser beam (B) sinters the portion (p2) of the fine lamella (20) in only one passage in the length (L2) of the fine lamella without round-trip passage of the laser beam (B),
   the direction (D1) of this passage being the same at the different layers (N) for building the different portions (p2) of the fine lamella, and
   the thickness (w) of the fine lamella is smaller than 0.2 mm, and the height (h) of the fine lamella 20 is smaller than or equal to 2 mm.

2. The selective laser sintering method according to claim 1, wherein the fine lamella has a complex shape in its length (L2), including but not limited to a wavy, sinusoidal or zig-zag shape or a combination thereof.

3. The selective laser sintering method according to claim 1, wherein the characteristics of the laser beam (B) are the same at the different layers (N) for building the different portions (p2) of the fine lamella (20).

4. The selective laser sintering method according to claim 1, wherein the fine lamella has a height (H) exhibiting a complex shape, including but not limited to, a wavy, sinusoidal or zig-zag shape or a combination thereof, in its height.

5. The selective laser sintering method according to a claim 1, wherein the tread molding element comprises a least two adjacent fine lamellas, in each layer (N) the laser beam (B) sinters portions (p2) of the two fine lamellas in one round-trip passage of the laser beam (B).

6. A tread molding element, comprising:
   a plurality of ribs;
   and a plurality of fine lamellas, wherein said tread molding element is manufactured by the selective laser sintering method according to claim 1.

7. At least one programmable controller for executing the selective laser sintering method according to claim 1.

8. The selective laser sintering method according to claim 1, wherein the tread molding element comprises a plurality of fine lamellas and a least one rib.

9. The selective laser sintering method according to claim 8, wherein the rib is sintered in a plurality of portions (p1) at the different layers (N), in each layer (N) the laser beam (B) sinters the portion (p1) of the rib in a plurality round-trip passages of the laser beam.

10. The selective laser sintering method according to claim 8, wherein for a same layer (N), the sintering of the fine lamella is along a first path (Pth1) and the sintering of the rib is along a plurality of parallel second paths (Pth2) different from the first path (Pth1).

11. The selective laser sintering method according to claim 8, wherein the laser sintering method uses a laser and further comprises the modification of the characteristics of the laser beam (B) according to the ribs or to the fine lamellas to be sintered.

12. The selective laser sintering method according to claim 10, wherein for two consecutive layers, the characteristics of the second paths (Pth2) for sintering two portions (p1) of the rib are different.

* * * * *